Figure 1:
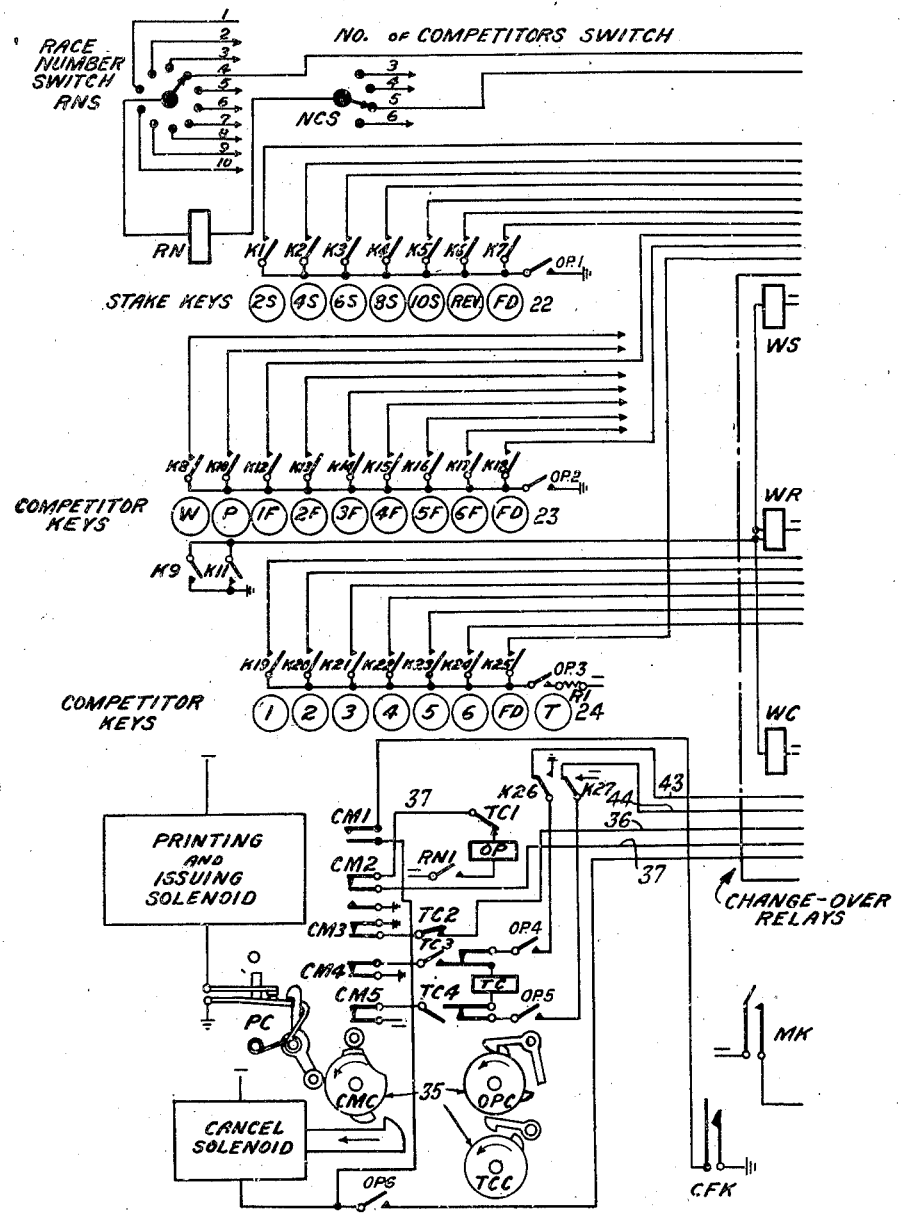

Aug. 23, 1949.  J. HANDLEY  2,479,681
TOTALISATOR SYSTEM
Filed Sept. 7, 1944  7 Sheets-Sheet 1

Aug. 23, 1949.    J. HANDLEY    2,479,681
TOTALISATOR SYSTEM
Filed Sept. 7, 1944    7 Sheets-Sheet 4

Patented Aug. 23, 1949

2,479,681

UNITED STATES PATENT OFFICE 2,479,681

TOTALISATOR SYSTEM

John Handley, London, England, assignor to The Union Totalisator Company Limited, Glasgow, Scotland, a British company Application September 7, 1944, Serial No. 553,009
In Great Britain June 10, 1943

Section 1, Public Law 690, August 8, 1946
Patent expires June 10, 1963

10 Claims. (Cl. 235—92)

This invention relates to improvements in electric totalisator installations of the type in which bets originated at ticket issuing machines are transmitted to counting apparatus which indicates the value of the bets laid on the competitors and the grand total of the bets on all of the competitors.

An installation according to the invention includes ticket issuing machines which provide facilities for betting in multiple values on the Win, Place and Forecast, for betting on any two selected competitors for first and second place in both orders (this being known as reversed betting), and for betting on the "Field" for first or second place with any selected competitor for second or first place (this being known as field betting).

In Forecast betting the person making the bet has to forecast which two out of all competitors in a race will finish first and second respectively. With six competitors there are therefore thirty possible combinations. Field betting is a form of Forecast betting in which the betting is on all combinations involved by either selecting a competitor to win with each of the remainder of the competitors in turn to run second, or conversely by selecting a competitor to run second with each of the remainder of the competitors to in turn win.

The installation according to the invention consists of:

(1) Ticket-issuing machines.
(2) Change-over relays.
(3) Common Win and Place equipment.
(4) Common Forecast equipment.

It may be explained that, as there is at least as large a volume of betting on the Forecast as there is on the Win and on the Place combined, the Win and the Place pools are grouped as one equipment with its own cabling, commutators, relay sets and counters.

(1) A ticket-issuing machine comprises:
   (a) Sets of keys which, on being depressed, select:
      (1) The Win and Place or the Forecast equipment.
      (2) The competitor's number or numbers.
      (3) The stake.
   (b) Type wheels which are set by the operation of the keys mentioned above, and prepared for the action of (c).
   (c) A printing and ticket-issuing solenoid.
   (d) Cash counters registering:
      (1) The total number of units sold by the machine.
      (2) The total number of "Win" units sold by the machine.
      (3) The total number of "Place" units sold by the machine.
      (4) The total number of "Forecast" units sold by the machine.
        A unit is generally the highest common factor of the various stakes for which the machine is equipped to issue tickets, e. g., when the machine can issue 2, 4, 6, and 8 shilling tickets, the unit is 2 shillings.

(1) A ticket-issuing machine comprises:—Continued.
   (e) Relays and spring-operated contacts which are controlled by the common Win and Place or the Forecast equipment, and in turn control the operation of the printing and issuing device.
(2) The change-over relays comprise a set of relays controlled by the operation of certain of the keys of the ticket issuing machine, and which in turn control the connection of the machine to either the common Win and Place equipment or to the Forecast equipment.
(3) The common Win and Place equipment comprises:
   (a) A commutator unit, to the segments of which are connected wires leading via the change-over relays to individual ticket-issuing machines. Rotating brushes passing over these segments connect the ticket issuing machines in turn to registering units.
   (b) Counters which are the registering units. One Win counter is provided for each competitor and an additional unit, the Win Total counter, registers the sum of all bets recorded by the Win counters. Similarly, one Place counter is provided for each competitor, in addition to a Place Total counter.
      Each counter consists essentially of one or more electromagnets, the operation of which causes the rotation of discs on which numerals are displayed. The rotation of the discs also operates contacts controlling slave indicators. When more than one electromagnet is fitted in a counter, the rotation of the discs is effected through differential gearing. In this way simultaneous operation of two or more electromagnets still results in the registration of all operations of all magnets.
   (c) Relays, keys and lamps which are used to aid in the operation of the commutator unit and counter electromagnets, to check these operations, to isolate fault conditions and to indicate fault conditions.
(4) The Forecast equipment is similar to the common Win and Place equipment described above. The essential difference is that Win and Place counters are replaced by "Combination" counters, i. e., one counter unit is provided for every combination of any two competitors in each order, for example 1 and 2, 2 and 1, 3 and 4, 4 and 3. A "Total" Forecast counter registers the grand total of all combinations.

An electric totalisator installation according to the invention is illustrated diagrammatically in the accompanying drawings in which Figs. 1 to 7 are views intended, when placed side by side in a row, to form a continuous diagram.

Fig. 1 shows the circuit of the ticket issuing machine, which includes a number switch RNS, having conductors numbered 1 to 10, and which is set by the operator to the correct race number (shown as No. 4 in the diagram). Operation of switch RNS mechanically rotates a type wheel (preparing the printing of the correct race number on the ticket to be issued): this wheel and its operating gears are not shown on the diagram. The operator also sets a number-of-competitors switch NCS to the correct figure; (the diagram shows four contacts and conductors numbered 3, 4, 5 and 6, for 3, 4, 5, and 6 competitors, respectively, and the switch is shown set for five competitors).

A race number relay RN is connected in series with these two switches RNS and NCS. When the two switches are set correctly, a condition depending on master control keys in the common apparatus (Race number key RNK, see Fig. 2, and Non-runner control NRC, see Fig. 3), relay RN is operated and prepares a circuit for relay OP (see Fig. 1). It will be seen later that relay OP controls the operation of the machine, and, therefore, unless the correct settings are made on switches RNS and NCS, no tickets can be issued by the machine.

Each ticket issuing machine has three rows of keys 22, 23, and 24. Below the race number relay RN is shown a row 22 of seven keys (numbered in this diagram 2S, 4S, 6S, 8S, 10S, REV and FD), with their contacts K1, K2, K3, K4, K5, K6, and K7, respectively. These, the front row of keys on the machine, are the stake keys, and the keys 2S to 10S are the 2 to 10 shilling keys. Depression of any one stake key closes its contact, preparing a circuit for the operation of the associated stake relays 28 to 34 shown in Figs. 3 to 7.

At the same time depression of a stake key rotates a type wheel, preparing to print the value of the stake on the ticket to be issued. Also operation of the stake key engages and controls mechanically gearing to actuate counters for registering the cash transaction. The amount of travel which is to be imparted to the cash counters varies with the key depressed; i. e., the 4 shilling key 4S imparts double the travel of the 2 shilling key 2S and so on. The key marked REV is for "Reverse Bets," a double transaction, and this key imparts double the travel of the 2S key. The key marked "FD" is for "Field Bets," a variable quantity depending on the number of competitors, and the travel imparted to the cash counter by this key is therefore adjusted by a mechanical interlock with the number of competitors switch NCS mentioned above. (None of the mechanical gears, interlocks and type wheels referred to in the present paragraph is shown in the circuit diagram.)

Under the stake keys is shown a row 23 of 9 keys marked W, P, 1&, 2&, 3&, 4&, 5& and 6& and FD, together with their contacts K8, K9, K10, K11, K12, K13, K14, K15, K16, K17 and K18. These are competitors keys; W and P are "Win" and "Place" keys, respectively; the remainder are keys associated with the first choice of a Forecast pair, key 1& representing No. 1 competitor to be first of the pair, key 2& representing No. 2 competitor to be first of the pair and so on. The key FD representing "the Field" to be first of the pair; i. e., a single competitor is chosen to be second of the pair and all other competitors covered as first choices: a group of x—1 transactions where x is the total number of competitors.

The W and P keys close contacts K8 and K10, respectively, preparing circuits for the operation of "Win" or "Place" relays in the common equipment. The same keys also close contacts K9, and K11 either of which closes a circuit to operate the changeover relays WS, WR and WC (see Fig. 1). The other keys on this row close contacts preparing circuits for the operation of the associated "combination" relays, of which three are shown in dot and dash rectangles in Figs. 5, 6, and 7, in the diagram as typical examples. These are relay 52 with A and B magnets for combination "Field &1," relay 53 having A and B magnets for combination "1 and Field," and relay 38 having magnets A and B for combination "1 & 2" competitors.

At the same time, depression of any key in this row (1) rotates type wheels preparing for printing of the relevant information on the ticket to be issued, and (2) engages the appropriate cash counter (Win for the "Win" key, Place for the "Place" key and Forecast for any of the other keys in the row, the "total" cash counter being in constant engagement.)

The lowest row 24 of keys consists of eight keys marked 1, 2, 3, 4, 5, 6, FD and T, respectively, and the first seven named have associated contacts K19 to K25, respectively. The first seven named keys from left to right are competitor keys and the six numbered 1 to 6 represent either "Win" or "Place" competitors or second choice competitors in a Forecast combination according as the "Win," "Place" or first choice competitor key has been operated in the row 23 above. The FD key represents the Field as a second choice in a Forecast combination. T is a test key which operates contact OP3. Operation of any one of the first six keys closes its associated contact and either (1) prepares a circuit for the selected "Win" or "Place" relay in the common equipment, or (2) completes the preparation of a circuit for a Forecast combination relay such as 52, 53 and 38. The key FD closes its contact, completing the preparation of a circuit for Forecast combination relays having the Field as second choice, for example relay 53. All keys in this row, by means of gearing not shown, rotate type wheels preparing for printing of the relevant information. The test key T is associated with two contacts K26, and K27 directly therebelow. When the test key is depressed, mechanical interlocks, not shown, (1) cause any other key that may have been operated to be released, (2) prevent the operation of any cash counter and (3) rotate a type wheel to prepare for the printing of a ticket marked Test. The closure of contacts K26 and K27 prepares a local circuit for the operation of the machine to issue this ticket.

When a complete set-up of keys has been operated, for a bet, a mechanism (not shown) is actuated to release a rotating contactor unit 35 shown diagrammatically in Fig. 1 beneath the lowermost row of keys. This contactor unit, which is spring-driven, consists essentially of (1) an operating cam OPC having two escapement teeth with its magnet OP and contacts OP1 to OP5, (2) a check cam TCC with its magnet TC and contacts TC1 to TC4, and (3) a control cam CMC with its contacts CM1 to CM5.

Set up of the stake and competitor keys releases the unit so that it is in the "ready" position. In this condition, when the continuously rotating brushes of the commutator CO of the commutator unit previously mentioned as part of the common equipment (see dot and dash rectangle in Fig. 2), reach the segments allotted to the ticket issuing machine under consideration, a circuit is completed from the control magnet contact CM3 through the normally made contact TC2, through a lead 36 and the rotating brushes of the commutator unit to a latching magnet LM of the latter, the operation of which lowers the speed of rotation of the brushes. At the same time a circuit is completed for the magnet OP (Fig. 1) from contact RN1, operated, contact TC1 normal, contact CM2, and lead 37 through the commutator brushes, and OP then operates.

Operation of OP closes its contacts OP1 to OP6. Contacts OP1 to OP3 in closing complete circuits through the "stake" and "competitor"

key contacts to the selected "stake" and "competitor" relays 28 to 34 and 38. Contacts OP4 and OP5 in closing prepare for a checking circuit back from the common equipment to operate the magnet TC. The contact OP6 in closing prepares a circuit for a "cancel solenoid" hereinafter referred to. At the same time, the armature of the OP magnet (which forms an escapement on the contactor rotor OPC) in operating, allows the rotor to move round to a second position where it is retained by the vertical arm of the escapement of the rotor OPC. When the checking circuit is completed in the counters, the magnet TC will operate and will open contacts TC1 and TC2, and make-before-break contacts TC3 and TC4 will close a holding circuit for the TC magnet over the made contacts CM4 and CM5 of the control cam CMC, while opening the operating circuit of magnet TC through contacts OP4 and OP5. The opening of contact TC1 breaks the circuit for the OP magnet and this will release, breaking the circuit closed by its contacts OP1 to OP5.

At the same time, the release of the OP magnet releases the escapement rocker for the rotor OPC and allows the contactor rotor OPC with its cams TCC and CMC to revolve. The teeth of the rotor cam OPC and the arm of its escapement rocker are not in the same plane. The opening of the contact TC2 will break the circuit to the latching magnet LM of the commutator unit; LM will restore, and release the commutator brushes which will now rotate at high speed until slowed down again when the next "set-up" issuing machine is found. Operation of the armature of the magnet TC lifts a catch engageable with a tooth on TCC, allowing the contactor rotor to complete its cycle of rotation and the control cam operates a "printing" contact PC, which in turn closes a circuit for the "printing and issuing solenoid." This solenoid prints and issues the ticket, actuates the selected cash counter, and pre-sets the rotating contactor unit 35 in readiness to receive another bet. During the rotation of the contactor unit (before operation of the printing solenoid) the cam CMC (1) opens its contacts CM4 and CM5, restoring the TC magnet to normal, (2) closes its contact CM1, preparing a "cancel" circuit to the "cancel solenoid," and (3) changes over the contact CM2, breaking and earthing the control lead to the commutator unit in the common equipment.

Some other apparatus (not part of the ticket issuing machine) is shown in Fig. 1.

The key CFK, cancel fault key, mounted in the common apparatus, is used to operate the cancel solenoid and restore the contactor unit to a position of readiness after the machine has been held in a fault condition.

Figure 2:
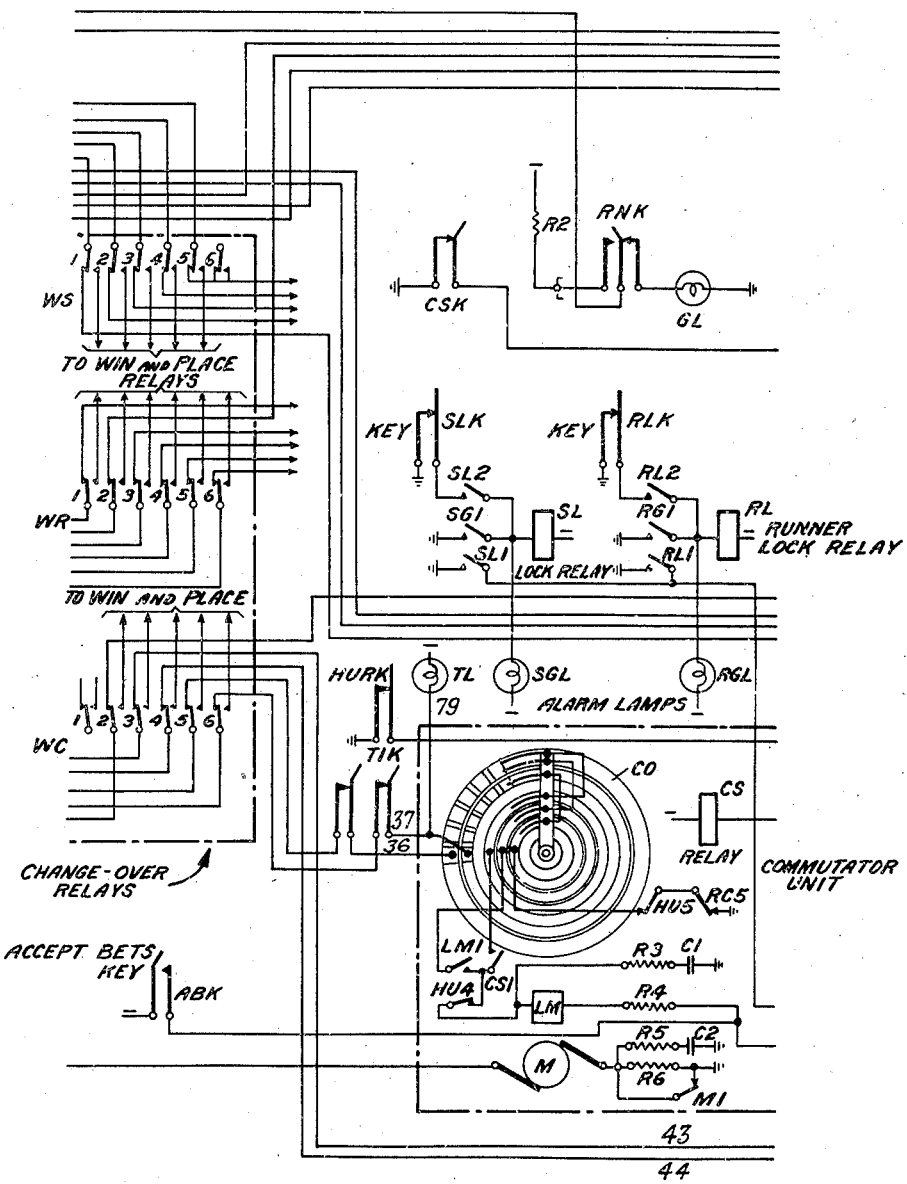

The magnets of the change-over relays WS, WR and WC are shown in Fig. 1 and in graphical relationship with these magnets, but in Fig. 2, in a dot and dash rectangle are shown the associated contacts numbered 1 to 6 for each relay. The windings of all the change-over relays, connected in parallel, are energised by the operation of either the "Win" or the "Place" key. Leads from the "stake" keys in the ticket issuing machine are taken to the contacts of WS relay. When this relay is not operated, connections through its contacts are made to the Forecast stake relays 28, 29, etc., in the common equipment (see Figs. 4 to 7). The illustrative lead from contact No. 1 is to relay 32. When the relay WS is operated, these connections are transferred by its contacts by downwardly pointed leads to similar "Win" and "Place" stake relays (not shown in the diagram). Similarly, the relay WR routes connections from the lower row of keys (see Fig. 1) either to forecast combination relays, e. g., 52 magnets A and B, by the illustrative lead from contact No. 2 (see Fig. 5), or to "Win" and "Place" competitor relays, (not shown in the diagram) by upwardly pointed leads. Again, the relay WC routes "control" leads from the contactor unit in the ticket issuing machine to the commutator unit (see Figs. 2 and 3) of the "Forecast" equipment or to the commutator unit of the "Win" and "Place" common equipment.

The key CSK of Fig. 2 is the "close sales" key and is thrown when ticket machine operators are ordered to cease selling. Throwing CSK breaks the circuit of a relay CS in the commutator unit (see Fig. 2), and the relay CS in releasing opens the contact CS1 (see Fig. 2); which breaks the circuit from the commutator unit latching magnet LM to the ticket issuing machine. When LM is not operating the rotating brushes of the commutator CO will not be slowed down to pick up bets from any set-up machine.

The race number key, RNK in Fig. 2, of which there is one for each race, is the common control associated with the race number switches RNS in the ticket issuing machines. When thrown, RNK provides a circuit through the common resistance R2 to operate the race number relay RN in the ticket issuing machines by NCS and MNCS. A guard lamp GL and coil lead provides an immediate indication of a short-circuit between race number connections.

Figure 3:
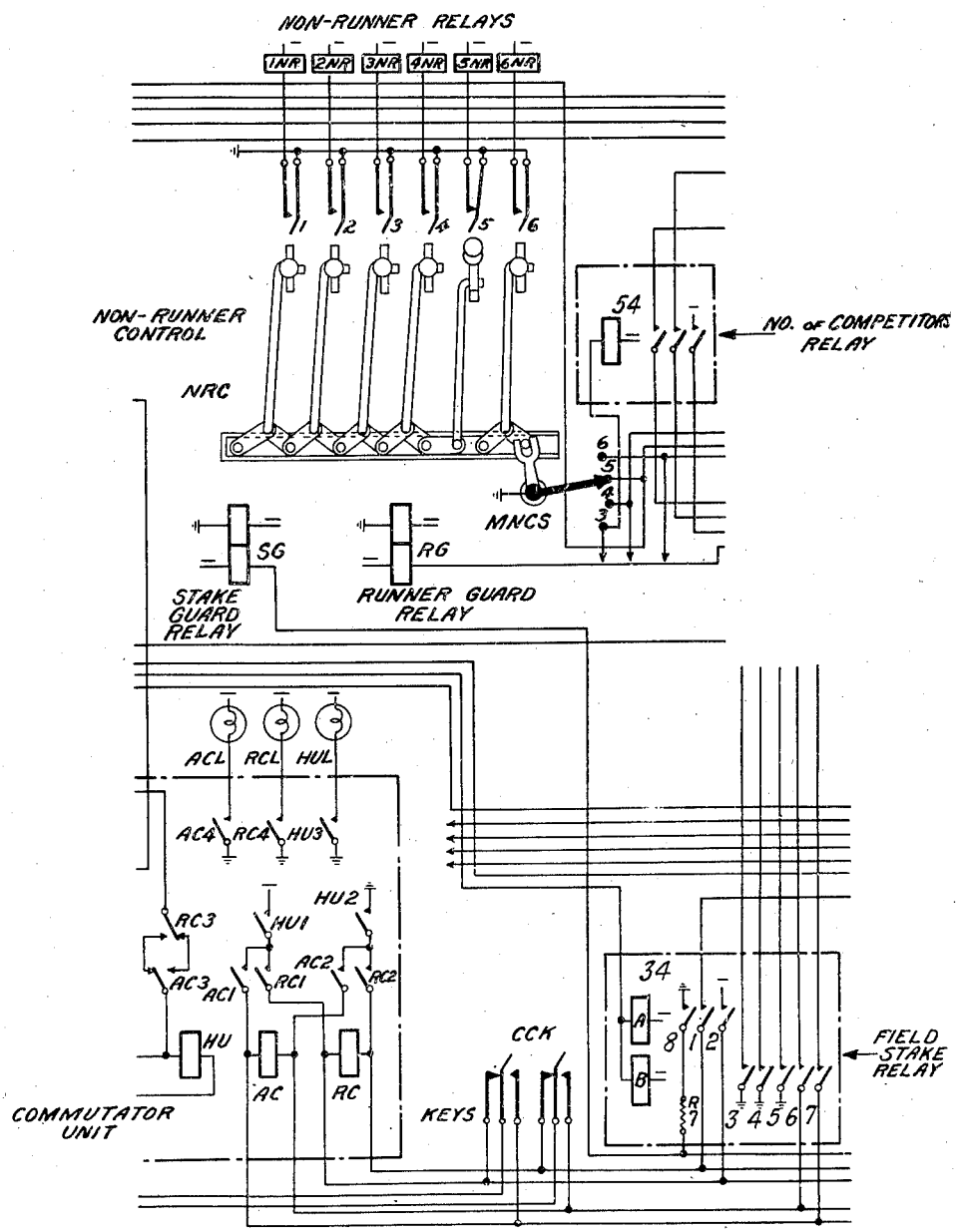

SL in Fig. 2 is a stake guard lock relay. In Fig. 3 is shown a stake guard relay SG, which operates momentarily if two or more pairs of "stake" relays, e. g., 34 and 33 operate simultaneously (through some fault such as a short circuit between stake connections). Relay SG in operating closes the contact SG1 (Fig. 2) and the relay SL operates and locks over its own contact SL2 to earth through the stake guard release key SLK. The contact SL2 also completes a circuit for the alarm lamp SGL. The contact SL1 earths a lead to a hold-up relay HU in the commutator unit (see Fig. 3), and this relay prevents bets being accepted by the commutator unit as will be described later.

The key SLK releases the relay SL. A similar arrangement consisting of a runner guard lock relay RL, a runner guard relay RG (in Fig. 3) and the runner guard release key RLK, with alarm lamp RGL, is included to deal with faults on "competitor" connections.

Below is a hold-up relay release key HURK which is used to release the hold-up relay when it has been locked up on a fault condition.

A key such as TIK in Fig. 2 is inserted in the control connections to each ticket issuing machine, and can be used to break these connections. This is the ticket machine isolating key. Associated therewith is a lamp TL which is lit when the check magnet TC in a machine fails to operate, because the roller tracking CMC drops into the recess and allows the needle contact of switch CM2 to drop onto the bottom contact.

In a small chain-dotted rectangle, partly in Fig. 2 and partly in Fig. 3 is shown the commutator unit. This consists of a rotor unit carrying brushes wiping on two concentric rings of segments and driven by a motor M. The unit includes four relays CS, HU, AC and RC, resistances and condensers.

The motor M is started by a motor key MK shown in Fig. 1 and its speed is controlled by a centrifugal governor shown diagrammatically as MJ associated with resistances R5 and R6 and the condenser C2. The motor drives the shaft carrying the brushes through gearing and a slipping clutch not shown. The normal speed of the shaft is reduced by the operation of the latching magnet LM which by means of mechanical interlocks (not shown) engages the gearing necessary for this reduction in speed.

The brushes on the rotor are six in number connected electrically to form three pairs. Of each pair one (the "slip ring" brush) makes contact with a slip ring while the other (the "segment" brush) wipes over one of the two rings of segments. Two "segment" brushes make contact with the outer ring of segments, the outer brush being set slightly in advance of the inner. The third "segment" brush makes contact with the inner ring of segments. The connections pairing "segment" and "slip ring" brushes are shown in the diagram.

The relay CS has one contact CS1; the relays HU, RC and AC have each five sets of contacts numbered 1 to 5. The latching magnet LM has one contact LM1. Associated with the relays HU, RC and AC and with LM is the accept bets key ABK, which, when thrown, provides a battery circuit.

The latching magnet LM is energised when the outer "segment" brush reaches a segment connected to a ticket issuing machine which is "set up" (earth being placed on this connection by the set-up condition). As LM operates, contact LM1 closes and brings the second or lagging "segment" brush into parallel with the leading brush. At the same time LM brings into action the slow gearing of the commutator brushes.

The inner "segment" brush, making contact with the segment in the inner ring associated with the same ticket issuing machine, completes a circuit through normally made contacts HU5 and RC5 (Fig. 2) for the operation of the OP magnet in the ticket issuing machine.

RC and AC are a "competitor" or "combination" check relay and a "total" check relay, respectively. They are operated by battery and earth supplied by the "stake" relays 28 to 34 through contacts on the "competitor" or "combination" and "total" counters, respectively, thus providing a check on the operation of these counters. Normally, the relays AC and RC will pulse under the control of successive contact operations in the counters, and will have no effect on the functioning of the installation. If, however, through some fault condition either the total counter of the competitor counter fails to operate and register the transaction, then either relay AC or RC will not receive an energising pulse. Let it be supposed that the total counter operates and that the competitor (or combination) counter fails. Relay AC operates but relay RC does not.

A circuit is made to operate the relay HU (Fig. 3) from the hold-up release key HURK through contact RC3 normal, contact AC3 operated, HU winding and the "accept bets" key ABK operated. Relay HU operates and closes a locking circuit for relay AC from contact HU2 operated, AC2 operated, AC winding, contact AC1 operated and contact HU1 operated. Relay AC locks up and the contact AC4 lights steadily the lamp ACL for relay AC. At the same time contacts HU5 and HU4 break the control connections to the commutator segment rings, and thence to any of the ticket issuing machines. Contact HU3 closes a contact to light the hold-up lamp HUL. Thus, briefly, the fault has caused all betting to stop (indicated by lamp HUL lit). The fact that lamp ACL is lit and lamp RCL is out shows that the last bet has failed to be registered on the "competitor" or "combination" counter. Release of the hold-up after any necessary examination and adjustment, is effected by a momentary opening of the key HURK. The circuit conditions if relay RC operates and relay AC fails are similar.

Referring to Fig. 3, at the top of the diagram is shown the non-runner control NRC. This consists essentially of six keys, 1 to 6, with six relays 1NR to 6NR and a "master" number of competitors switch MNCS. Briefly, the function of this apparatus is (1) to prevent the registering of a bet and the issue of a ticket on a non-runner and (2) to prepare the connections for adjusting the number of combination counters operated and the number of transactions registered on the total counter when a "field" bet is set up.

When one or more of the keys 1 to 6 is operated, it closes a circuit for the operation of the associated non-runner relay or relays 1NR to 6NR. At the same time the mechanical interlock shown diagrammatically causes the switch MNCS to move from its normal position on the contact 6 to contact 5, 4 or 3 according to the number of keys depressed. (Fig. 3 shows No. 5 competitor as a "non-runner" and a total of five competitors in the race.) The switch MNCS closes a circuit for one of four "number of competitors" relays 54, 55, 56 and 57 (shown in Figs. 3 and 4), and also completes a circuit to the "number of competitors" switch NCS in the ticket issuing machines (as previously described). The selected "number of competitors" relay (shown as 56) operates and closes contacts preparing selected connections between the field stake relays 34, A and B (see Fig. 3) and the "total counter" 40 in the dot and dash rectangle in Fig. 7.

In the example shown connections are made for the 2 and 6 shilling magnets 2S and 6S of the "total" counter registering a bet of 8 shillings or four 2 shilling units, there being four transactions in any field combination; e. g. 1& means 1 & 2, 1 & 3, 1 & 4 and 1 & 6, (No. 5 being a non-runner).

When a key of NRC is depressed, the associated non-runner relay 1NR to 6NR in Fig. 3 is operated. Its contacts 1, 2, 3 and 4 of "Non-Runner controls" 70 and 71 breaks feed and loops to the affected counters via the "Field" combination relays 52 and 53. (See Fig. 5 and Fig. 6.) For example, referring to Fig. 6 and supposing No. 2 to be a non-runner, contact 3 of 2NR in control 71 is normally made and supplies earth via contact 13 on the relay 53, B to the 2 shilling magnet 2S on 1 & 2 combination counter 39 (see Fig. 7). When contact 3 of 2NR is broken, this feed is removed and the 2 shilling magnet on the counter cannot operate. Further, to prevent any possibility of a check back from this counter, the loop contact 1 on the 1 & 2 combination counter 39 which normally makes on each operation of the 2 shilling magnet is short-circuited by contact 4 of 2NR in control 71. Similarly, contacts 1 and 2 of 2NR in control 70 of Fig. 5 will perform the same functions on the 2 & 1 combination counter (not shown) through contacts 13, 14 and 15 of the field combination relay 52, B shown in Fig. 5.

Figure 4:
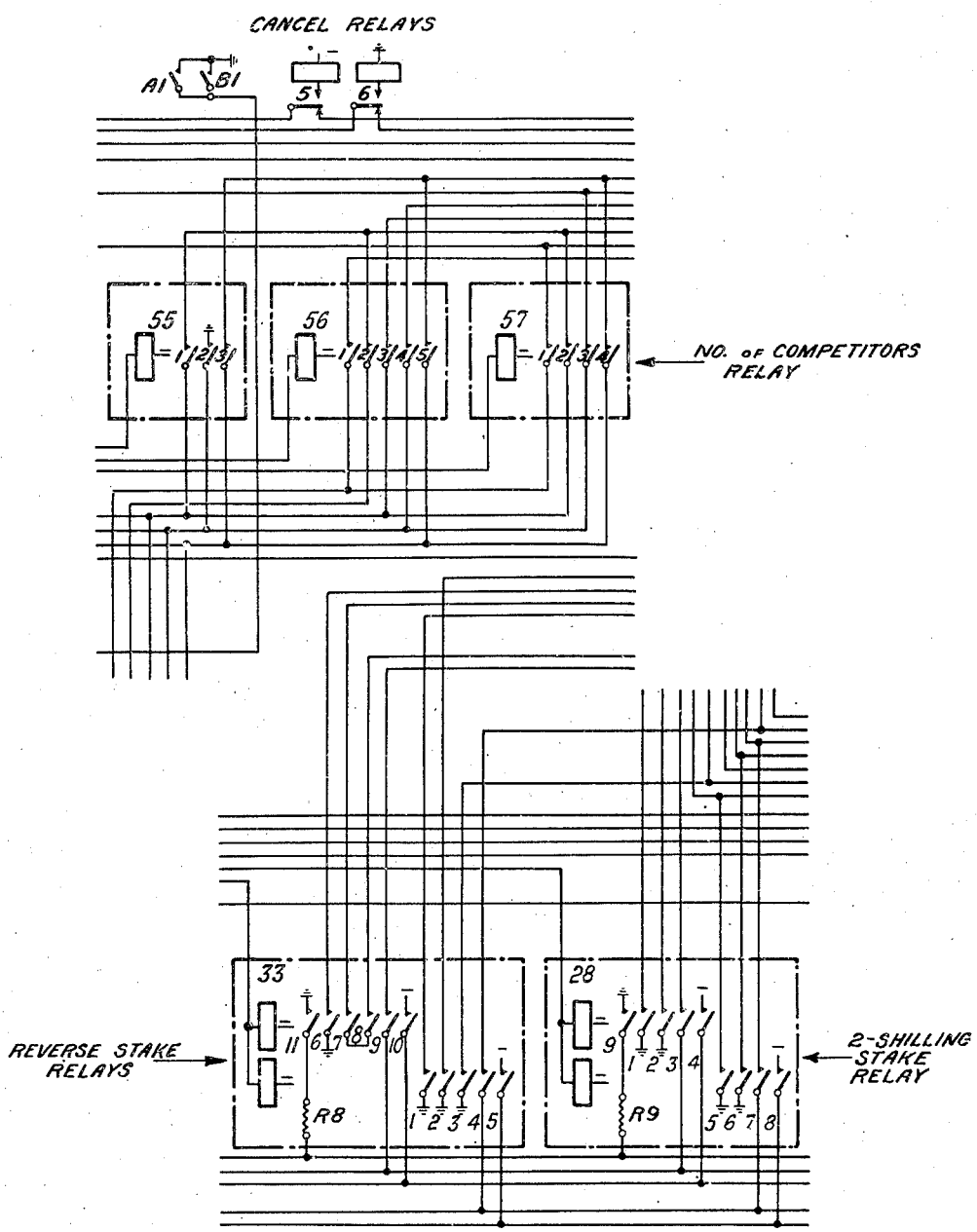

Non-runner contacts 5 and 6 of the "cancel relays," Fig. 4 break the first and second competitor leads such as those from the contacts K12 and K20 of the ticket issuing machines to the combination counters, and connect these leads to the cancel relays A and B. If either 1NR or 2NR relays in the example shown, operates, relay A or B is energised, and the closing of contacts A1 or B1 sends an earth back to the ticket issuing machine from which the fault originated to operate the "cancel solenoid" via contact OP6 (see Fig. 1). The cancel solenoid in the machine resets the contactor unit 35 in the machine concerned to its original position, and releases the keys set up.

At the bottom of Fig. 3 is a key CCK—the check change-over key. It has previously been described how the relays AC and RC in the commutator unit are operated by feeds sent back from the counters. It has also been described how the same check feeds operate the TC magnet in the ticket issuing machine. These feeds pass through the CCK key and normally the feed to RC is transmitted via the key to the ticket issuing machine through leads 43 and 44. If CCK is operated, connections are made to feed the AC check instead of the RC check back to the machine.

Figure 5:
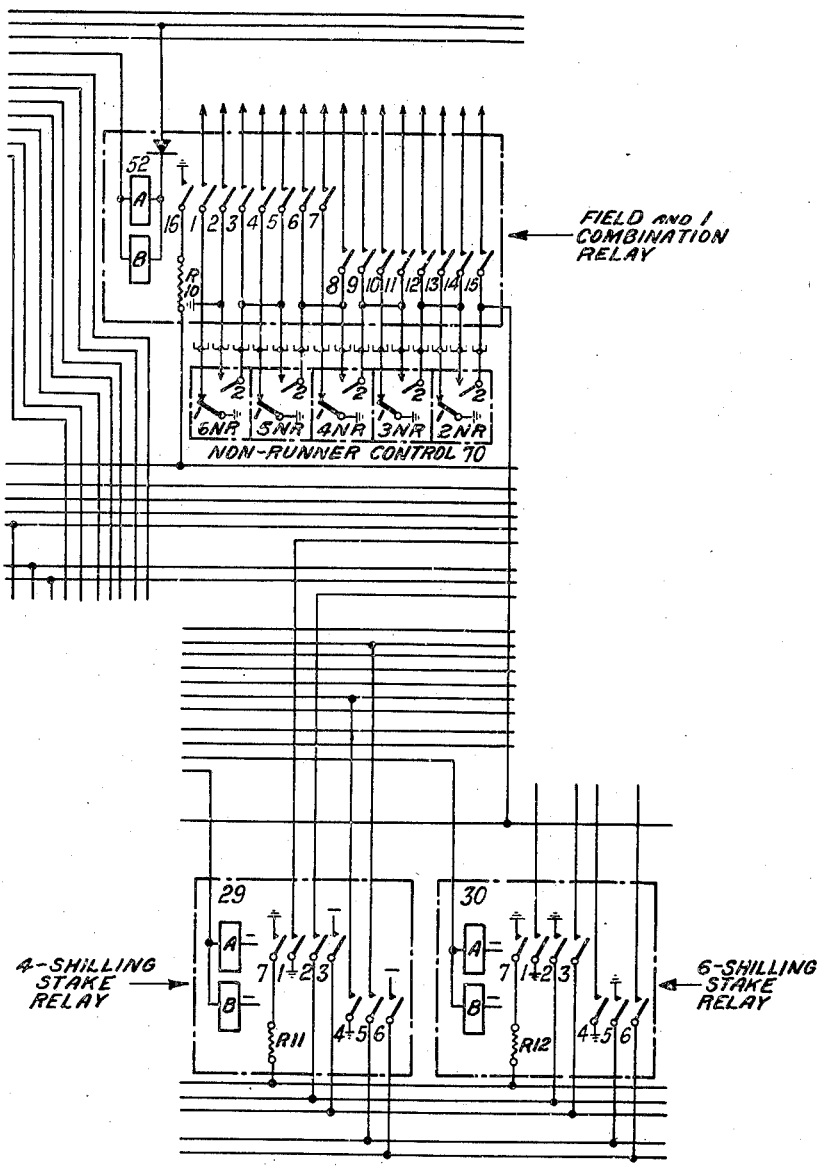
Figure 6:
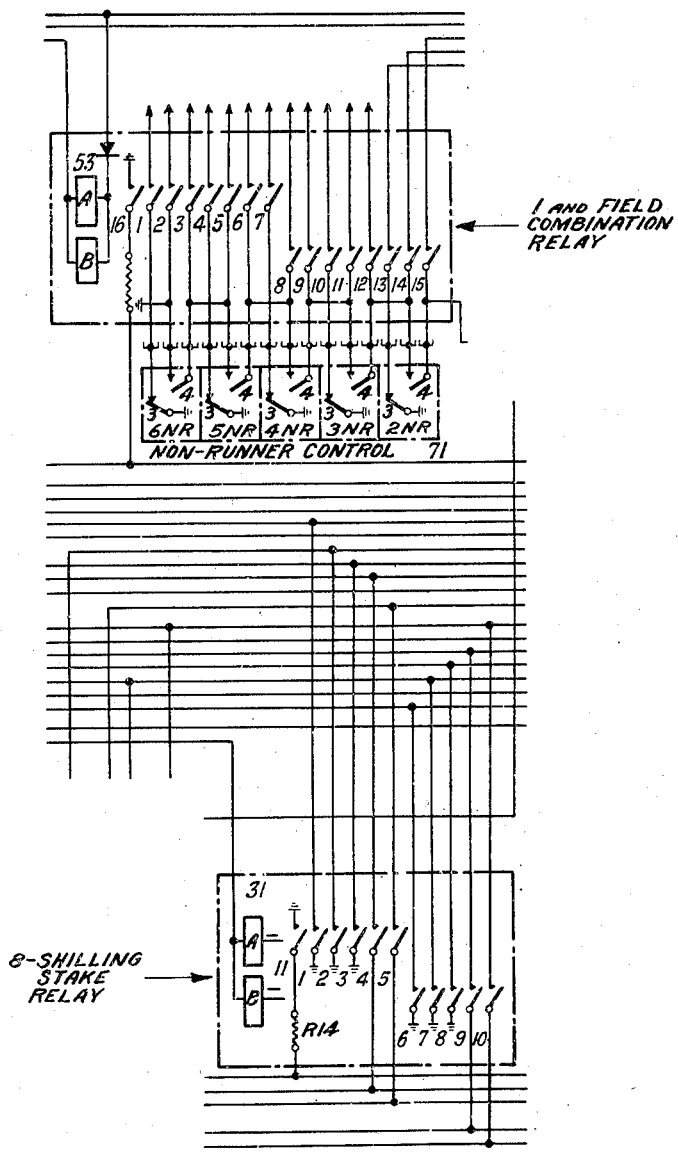
Figure 7:
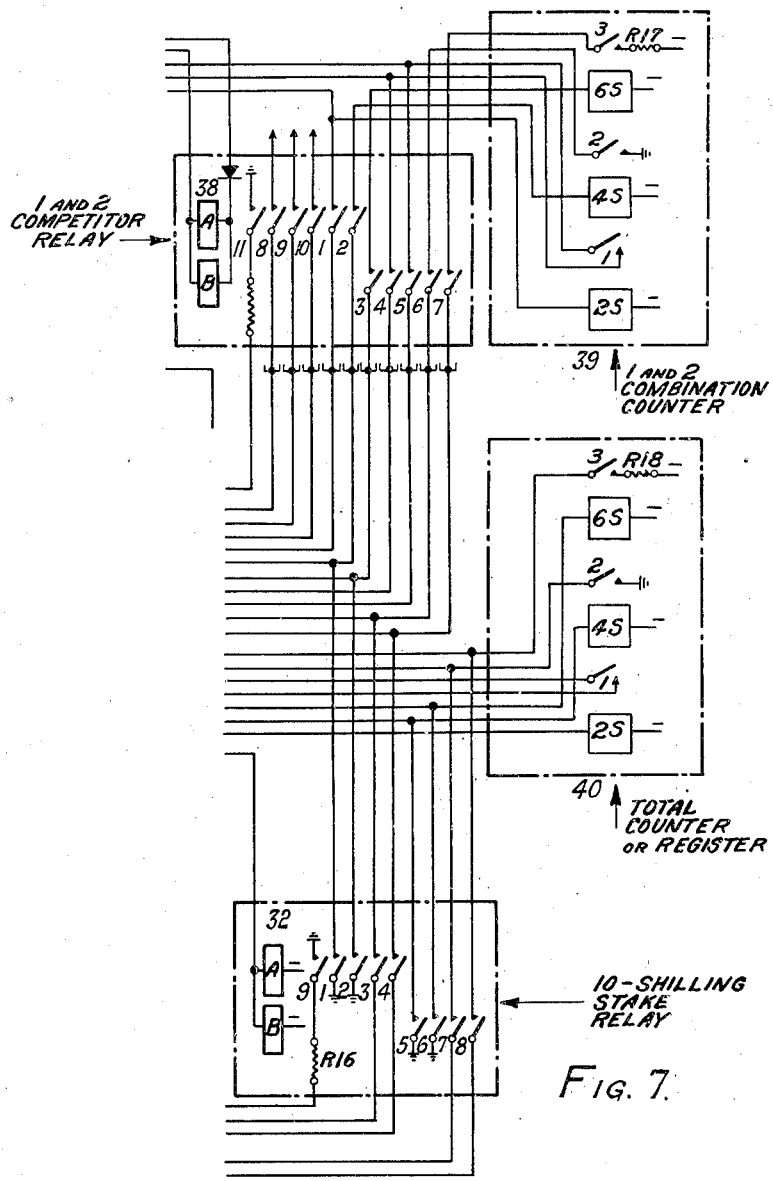

To the right of CCK are the "stake" relays, 34 A & B in Fig. 3; 33 A & B and 28 A & B in Fig. 4; 29, A & B and 30, A & B in Fig. 5; 31, A & B in Fig. 6 and 32 A & B in Fig. 7. These pairs of relays are for Field, Reverse, 2, 4, 6, 8 and 10 shilling stakes, respectively, and are operated by depression of the associated "stake" keys in the ticket issuing machines. Note for example that the circuit for the 10S key is shown complete, and passes through the WS relay to the 10 shilling relay 32. These stake relays select circuits to operate only those electro-magnets in the counters, such as 39 and 40, which will register the value of the bet, e. g., the 2 shilling relay 28 operates magnet 2S; relay 29 the magnet 4S; relay 30 magnet 6S; relay 31 magnets 2S and 6S; relay 32 magnets 4S and 6S. The stake relays also close contacts to transmit back to the commutator unit and ticket issuing machine the check conditions originated by the counter when the latter operates.

To give a typical example, consider the 2 shilling stake relays 28, A and B in Fig. 4. When the 2 shilling stake relay key 2S in the row 22 of the ticket issuing machine is depressed, relays A and B of 28 operate and close their contacts numbered 1 to 9. Contact 1 closes an earthed circuit commoned over all combination relays. In the example let us suppose that combination 1 and 2 has been selected, then combination relay 38 (see Fig. 7) is operated. The circuit from contact 1 on the relay 28 is routed through contact 1 on the 1 & 2 combination relay 38, and the 2 shilling electro-magnet 2S on the 1 & 2 combination counter 39 (see Fig. 7) to battery. The electro-magnet 2S operates.

Contact 2 on the 2 shilling stake relay 28 closes an earth circuit through contact 4 on the 1 & 2 combination relay 38, through contact 1 on the 1 & 2 combination counter 39 (which is closed by the operation of the electro-magnet 2S) back through contact 5 on the 1 & 2 combination relay 38, through contact 3 on the 2 shilling stake relay 28, through RC relay in the commutator unit (see Fig. 3), back through contact 4 on the relay 28 to battery. This operates relay RC and a parallel circuit is tapped off from the key CCK to operate the TC magnet in the ticket issuing machine (see Fig. 1).

Contact 5 on the relay 28 closes an earthed circuit through the 2 shilling electro-magnet 2S on the total counter 40 (see Fig. 7) to battery. This electro-magnet operates and closes its contact 1.

Contact 6 on the relay 28 closes an earthed contact, through contact 1 on the total counter 40 back through contact 7 on the stake relay 28, through relay AC in the commutator unit, back through contact 8 on the stake relay 28 to battery. This operates the total check relay AC.

Thus, contacts 1 to 8 have provided circuits to (a) operate the correct electro-magnets in the combination and total counters 39 and 40 for the registration and indication of the bet, and (b) route the "operation checking" circuits from the combination and total counters to the checking relays RC and AC in the commutator unit and to the checking magnet TC in the ticket issuing machine.

Contact 9 on the stake relay 28 provides a guard against the simultaneous opertion of two or more stake relays. This guard operates as follows: Contact 9 on the 2 shilling stake relay 28 earths through a resistance R9 a lead common to all other stake relays, and connected through one winding of guard relay SG to battery. Relay SG is so designed that it will not operate in series with resistance R9. Should, however, another stake relay be operated, then a second earth is connected to the common lead through a second resistance R8, R11 etc., similar to R9. Relay SG, being now connected in series with two or more resistances in parallel, will operate on the increased current, and in turn to close its contact SG1 and operate relay SL (Fig. 2). This second relay locks itself over a key SLK as previously described, stops betting, and gives an alarm.

The connections for the field stake relay are shown primarily in Figs. 3 to 7 except of course that this relay 34 is shown connected to the field key, the last of the stake keys 22 in Fig. 1. When the relay 34, A & B and the number of competitors five-runner relay 56 are operated contact 3 of relay 34 provides a grounded circuit through contact one of relay 56 to operate the two shilling magnet 2S of the total counter 40. Contact 4 of relay 34 provides a grounded circuit via contact 2 of relay 56 to operate the 6 shilling magnet 6S of the total counter 40. Contact 5 of the field stake relay 34 also provides a grounded circuit via contact 3 of relay 56 through contact 1 of magnet 2S of the total counter 40 and back via contact 4 of relay 56 and contact 6 of relay 34 through relay AC and back via contact 7 of relay 34, contact 5 of relay 56 and contact 3 of the 6 shilling magnet of counter 40, by which the circuit is connected to battery through resistance R18. This circuit records an 8 shilling bet on the total counter 40 and checks its operation by way of the relay AC. Certain of these functions are essentially the same as those described above in connection with the circuits connected through the 2 shilling stake relay 28.

In Figs. 5, 6 and 7, above the stake relays are shown the competitor or combination relays 52, A & B, 53, A & B and 38, A & B. These are typical. One such relay (or pair of relays) is fitted for each competitor (Win and Place) and for each combination (Forecast).

These relays are energized by the depression of the competitor keys in the ticket issuing machine, and close circuits to operate all three electro-magnets in the associated counters and to transfer check circuits from these magnets. The stake relays, as has been previously described, select only those magnets (and therefore checks) necessary to register the amount of the transaction.

A guard contact with resistance (R10, R13, R15), similar to that already described in connection with the stake relays, operates in conjunction with the competitor guard relay, RG (see Fig. 3) to give an alarm when two or more competitor or combination relays are operated simultaneously.

To the right in Fig. 7 are shown diagrammatically the circuit arrangements of two typical counters, the 1 & 2 combination counter 39 and a total (Forecast) counter 40. Electrically, each counter consists of three magnets 2S, 4S and 6S with three sets of check contacts (closing on the operation of the associated magnet) 1, 2 and 3, respectively. Contact 1 closes a loop, through contacts on the competitor or combination relay, back to the stake relay, for energisation of the check relays AC and RC and check magnet TC in the ticket issuing machine as has been previously described. Contact 2 earths a connection, and contact 3 places battery (through a resistance, e. g., R17 or R18) on a connection, through the competitor and stake relays, for the same purpose.

The circuits between the various relays are readily traced by following the conductors shown in the drawings. Some conductors are not shown completely as indicated by arrow points. However, the paths of various groups of conductors such as from the ticket issuing machine and relays WS, WR, WC, etc., are indicated by an example.

It is to be understood that while the bet unit is referred to in shillings it may be in dollars or other currency.

What is claimed is:

1. An electric totalisator installation including a ticket issuing machine providing facilities for registering the amounts of bets made on competitors in the classes of Win, Place and Forecast, on any two selected competitors for first and second place in both orders, and on the Field for first or second place with any selected competitor for second or first place, a plurality of counters for separately registering the amounts for each of the different classes and combinations of bets, a total counter for registering the total value of all bets, said ticket issuing machine including key-operated contact means for selecting the amount of the stake of each bet, a key-operated contact means for selecting the class of bet and the competitor or competitors, a rotary contactor unit operable upon operation of a set of keys for a given bet, said unit including means for closing circuits through the contacts of the operated keys, a commutator unit, means for driving the commutator unit, circuit means including a control relay for connecting the commutator unit with the circuit closing means of the rotary contactor unit, and an electrical circuit means associated with the key-operated means for transmitting electrical impulses from the key-operated contacts of the ticket issuing machine to a selected separate counter for the class of bet made and to the total counter, each counter including electrically-operated means connected into the circuit means for registering the amount of a bet on the selected counter and on the total counter.

2. An electric totalisator installation as defined by claim 1 in which the electrical circuit includes a change-over relay for selecting the counter for a particular class of bet, and means on the ticket issuing machine for energizing said relay.

3. An electric totalisator installation as defined by claim 1 in which the electrical circuit includes a set of change-over relays normally biasing the circuit away from the registration of bets on the Win and Place counters, and in which said key-operated means includes keys for shifting said relays for the registration of bets on the Win and Place counters.

4. An apparatus as defined by claim 1 in which the said electrical circuit means includes a stake relay for the amount of each stake selectable by the key-operated contact means of the ticket-issuing machine for the corresponding stake amount, and in which said key-operated contact means includes a key for each amount, actuating means for each stake relay, and impulse transmitting-means from the respective keys for transmitting an impulse through the actuating means of the respective stake relays.

5. An electric totalisator installation as defined by claim 4 in which the stake relays are electrically connected to the total counter, and means for electrically connecting said stake relays to a selected class-of-bet counter by actuation of the corresponding class key in the ticket-issuing machine.

6. An electric totalisator installation as defined by claim 5 in which the means for electrically connecting the stake relays to the selected class-of-bet counter includes a competitor relay, and a conductor from a competitor key in the ticket-issuing machine for activating the competitor relay.

7. An electric totalisator installation for registering the amount of stake bets including a ticket-issuing machine provided with means for selecting the amount of the stake, means for selecting a competitor or combination of competitors on which a bet is placed, a plurality of competitor counters for separately registering the amounts of the bets on the different competitors or combinations of competitors, a total counter for registering the total of the amounts bet, a separate stake relay for each stake amount selectable by the amount-selecting means of the ticket-issuing machine, each relay being directly connected in circuit with its respective stake amount-selecting means in the ticket-issuing machine and operated solely in response to an electric impulse transmitted thereto by actuation of the respective stake amount-selecting means, and an electrical circuit means connecting said stake relays to all competitor counters and to the total counter, a separate electric circuit including a competitor relay responsive solely to an electric impulse transmitted from the competitor selector means in the ticket-issuing machine.

8. An electric totalisator installation as defined by claim 7 in which the electrical circuit means is arranged to connect the total counter in parallel with the competitor counters.

9. An electric totalisator installation as defined by claim 7 in which each counter includes at least three electro-magnets connected into said circuit means and representing separate amounts of increasing value from a unit value, of which the others are multiples.

10. An electric totalisator installation as defined by claim 7 in which each stake relay includes a plurality of contacts, and electromagnetic means for closing said contacts and operable by the corresponding amount-selecting means of the ticket-issuing machine.

JOHN HANDLEY.

REFERENCES CITED

The following references are of record in the file of this patent:

UNITED STATES PATENTS

| Number | Name | Date |
|---|---|---|
| 2,121,164 | Robinson | July 13, 1934 |
| 2,032,972 | Black et al. | Mar. 3, 1936 |
| 2,071,184 | Stewart et al. | Feb. 16, 1937 |

FOREIGN PATENTS

| Number | Country | Date |
|---|---|---|
| 448,901 | Great Britain | June 17, 1936 |
| 510,441 | Great Britain | July 31, 1939 |